United States Patent [19]

Fuji

[11] Patent Number: 5,465,248

[45] Date of Patent: Nov. 7, 1995

[54] DEFLECTING A LIGHT BEAM IN THE SAME DIRECTION AND SPEED OF A RECORDING MEDIUM BY A ROTATING POLYGON OR A HOLOGRAPHIC DISK

[75] Inventor: Hiroshi Fuji, Nara, Japan

[73] Assignee: Sharp Kabushiki Kaisha, Osaka, Japan

[21] Appl. No.: 172,134

[22] Filed: Dec. 22, 1993

[30] Foreign Application Priority Data

Dec. 22, 1992 [JP] Japan .................... 4-342668

[51] Int. Cl.⁶ .................................................. G11B 7/00
[52] U.S. Cl. .................. 369/112; 369/44.32; 369/119; 369/116; 369/275.4
[58] Field of Search .................. 369/112, 33, 122, 369/119, 275.4, 44.32, 116; 372/29; 359/212; 385/4

[56] References Cited

U.S. PATENT DOCUMENTS

| | | | |
|---|---|---|---|
| 4,130,898 | 12/1978 | Urbach et al. | 365/215 |
| 4,815,059 | 3/1989 | Nakayama et al. | 369/112 |
| 4,831,626 | 5/1989 | Watanabe et al. | 372/29 |
| 5,126,873 | 6/1992 | Ang | 359/212 |
| 5,136,559 | 8/1992 | Nakayama | 369/119 |
| 5,140,653 | 8/1992 | Taneya | 385/4 |
| 5,289,444 | 2/1994 | Tanaka | 369/119 |
| 5,321,684 | 6/1995 | Schaefer et al. | 369/119 |
| 5,383,174 | 1/1995 | Numata et al. | 369/119 |

FOREIGN PATENT DOCUMENTS

| | | |
|---|---|---|
| 58-182134 | 10/1983 | Japan . |
| 59-114242 | 7/1984 | Japan . |
| 60-229276 | 11/1985 | Japan . |
| 61-090336 | 5/1986 | Japan . |
| 61-144735 | 7/1986 | Japan . |
| 62-266517 | 11/1987 | Japan . |
| 62-281124 | 12/1987 | Japan . |
| 63-56612 | 11/1988 | Japan . |
| 64-46231 | 2/1989 | Japan . |
| 1-253828 | 10/1989 | Japan . |
| 2-263333 | 10/1990 | Japan . |
| 02263333 | 10/1990 | Japan . |
| 3-35425 | 2/1991 | Japan . |
| 3-185628 | 8/1991 | Japan . |

OTHER PUBLICATIONS

"Holographic Laser Scanner", N. Nishida, JSPE, No. 56–10, p. 13 through 16, Oct. 1990.

Primary Examiner—Georgia Y. Epps
Assistant Examiner—Kim-Kwok Chu
Attorney, Agent, or Firm—David G. Conlin; Kevin J. Fournier

[57] ABSTRACT

An optical recording device forms on a magneto-optical disk 10 a recording mark corresponding to a recording data by focusing a light beam d into a light spot on a projection start position on the moving magneto-optical disk 10 and by raising the temperature of a portion of the magneto-optical disk 10 exposed to the light spot. An optical reproduction device includes a light-beam deflecting section 2a having a polygon mirror 8, a holographic disk, and a plurality of semiconductor lasers for repeatedly performing a unidirectional scanning in synchronism with recording data or a recording clock signal by moving the light spot from the projection start position in a direction equal to the moving direction of the magneto-optical disk 10 and to follow the moving speed of the magnet-optical disk 10.

20 Claims, 17 Drawing Sheets

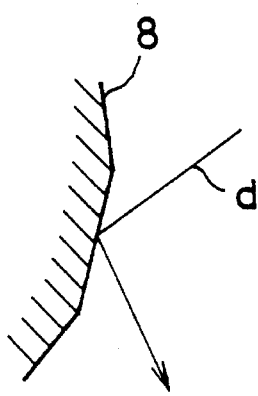 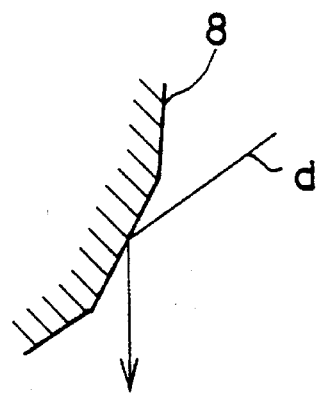 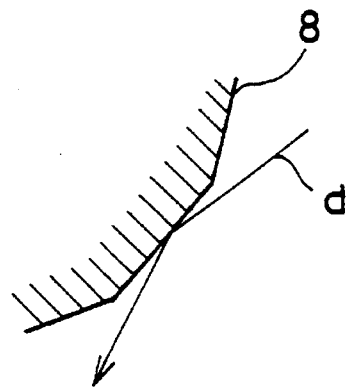
FIG.2 (a)   FIG.2 (b)   FIG.2 (c)
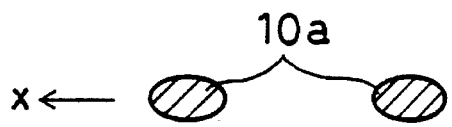 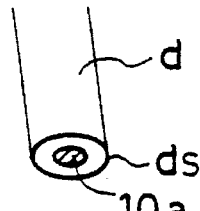
FIG.3 (a)
 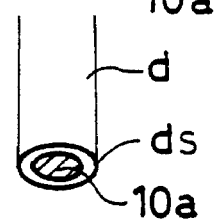
FIG.3 (b)
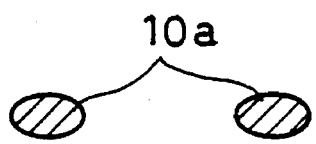 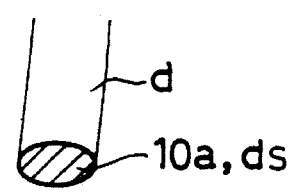
FIG.3 (c)

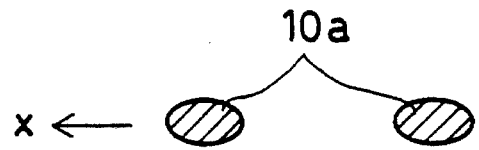 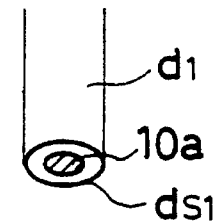
FIG.7(a)
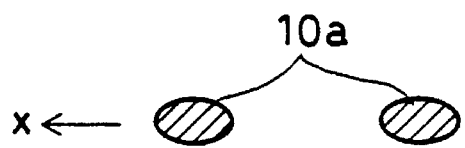 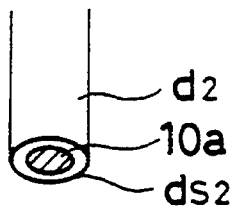
FIG.7(b)
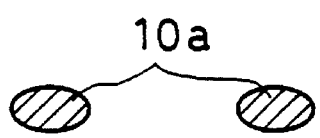 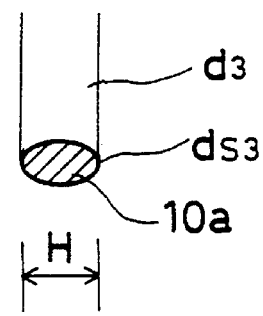
FIG.7(c)
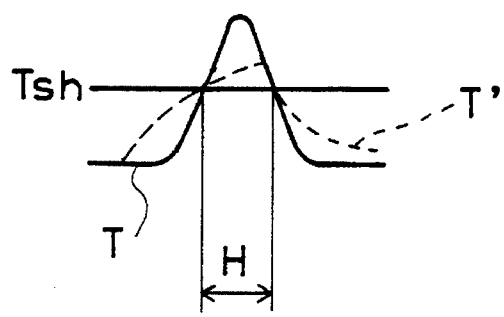
FIG.8

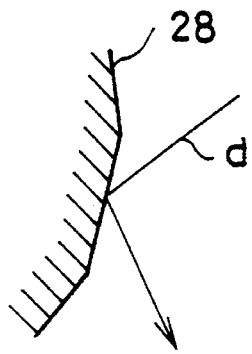 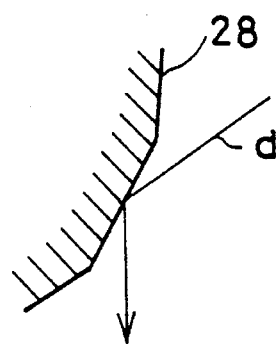 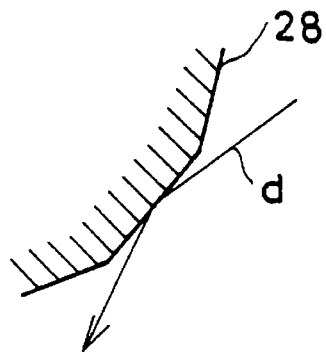
FIG.10 (a)   FIG.10 (b)   FIG.10 (c)
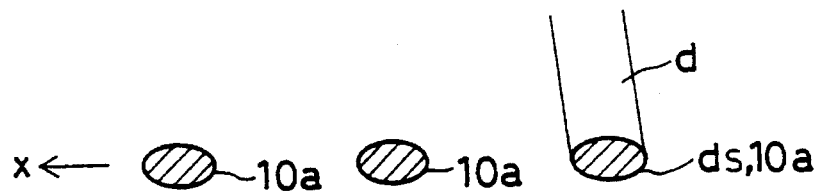
FIG.11(a)
FIG.11(b)
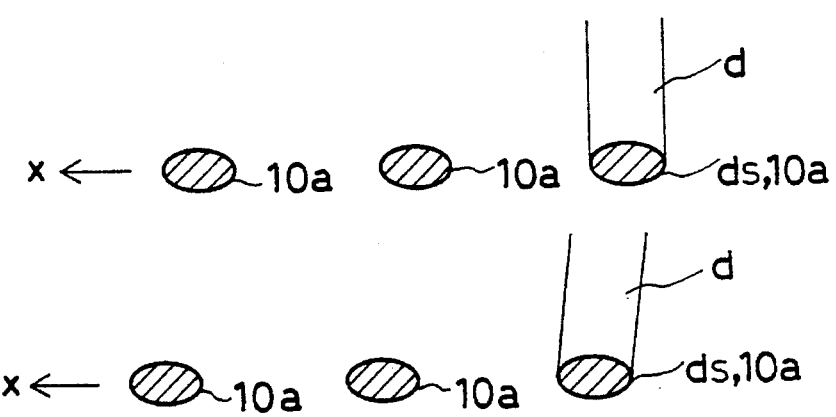
FIG.11(c)

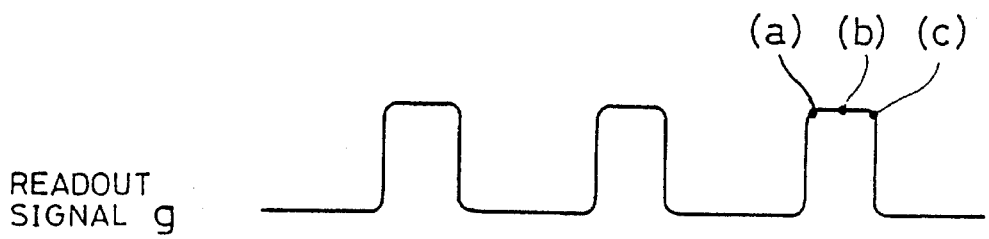
FIG. 12
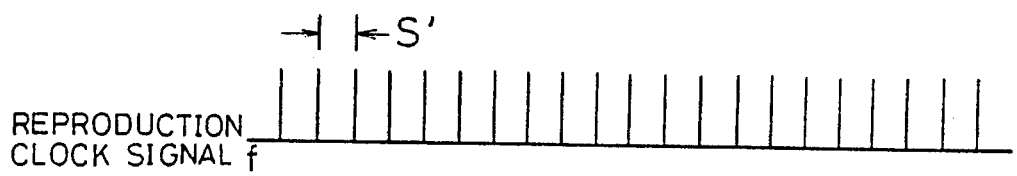
FIG. 13(a)
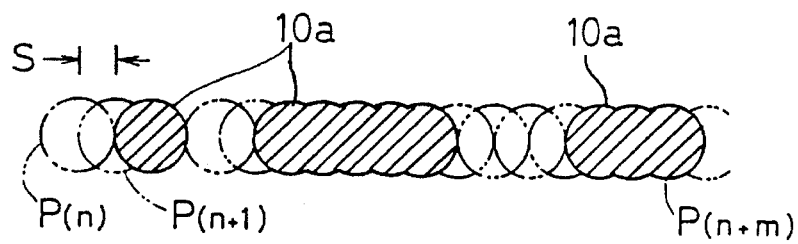
FIG. 13(b)
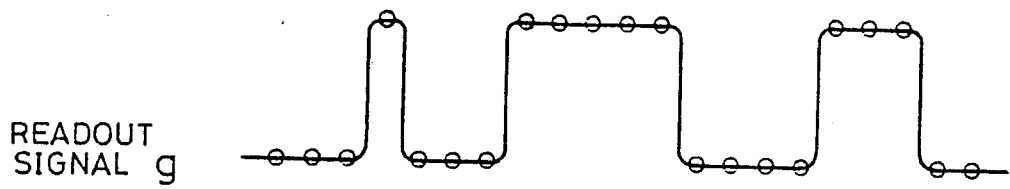
FIG. 13(c)
REPRODUCED DATA h    0 0 0 1 0 0 0 1 1 1 1 1 0 0 0 0 1 1 1 0 0
FIG. 13(d)

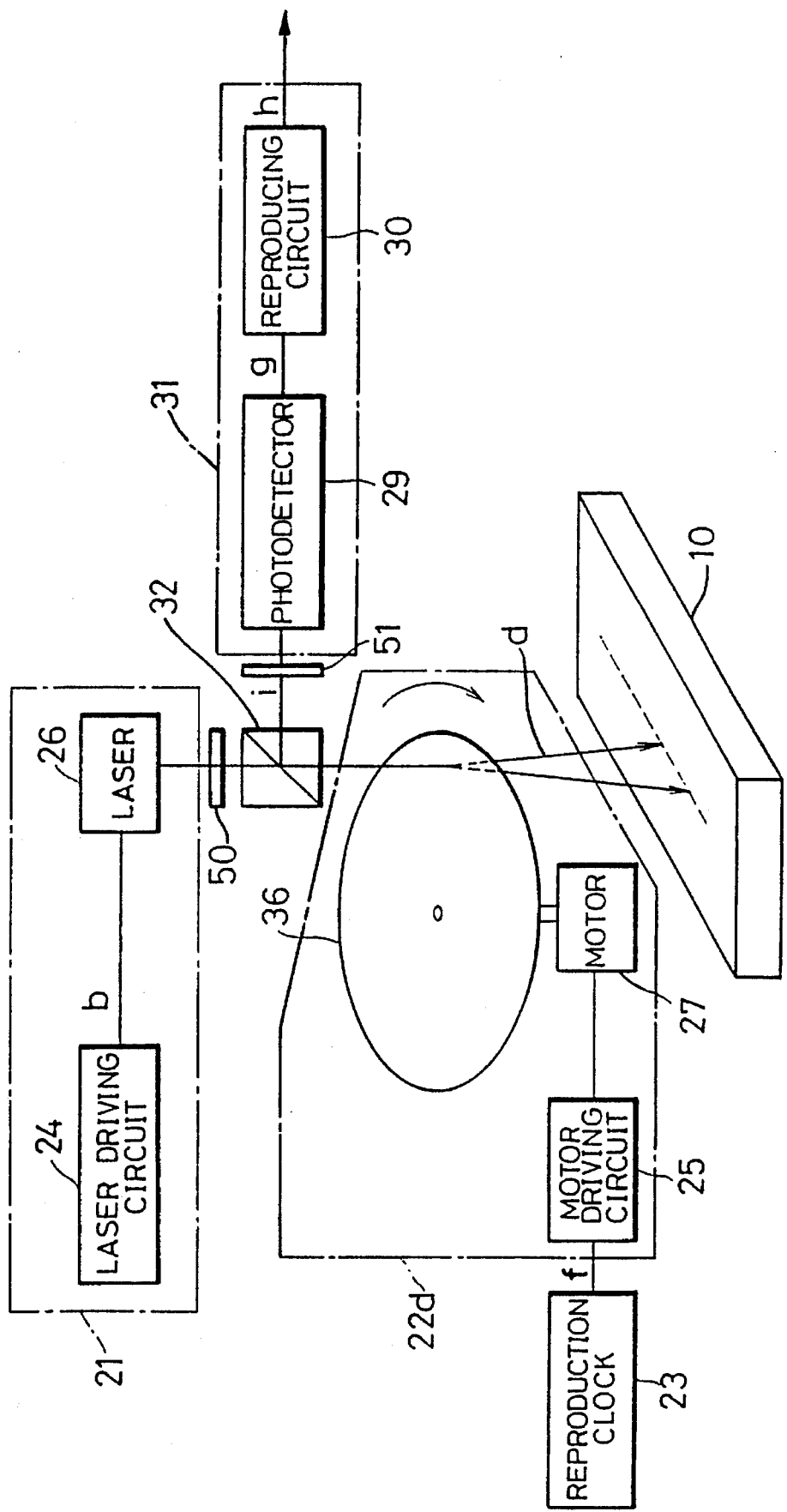

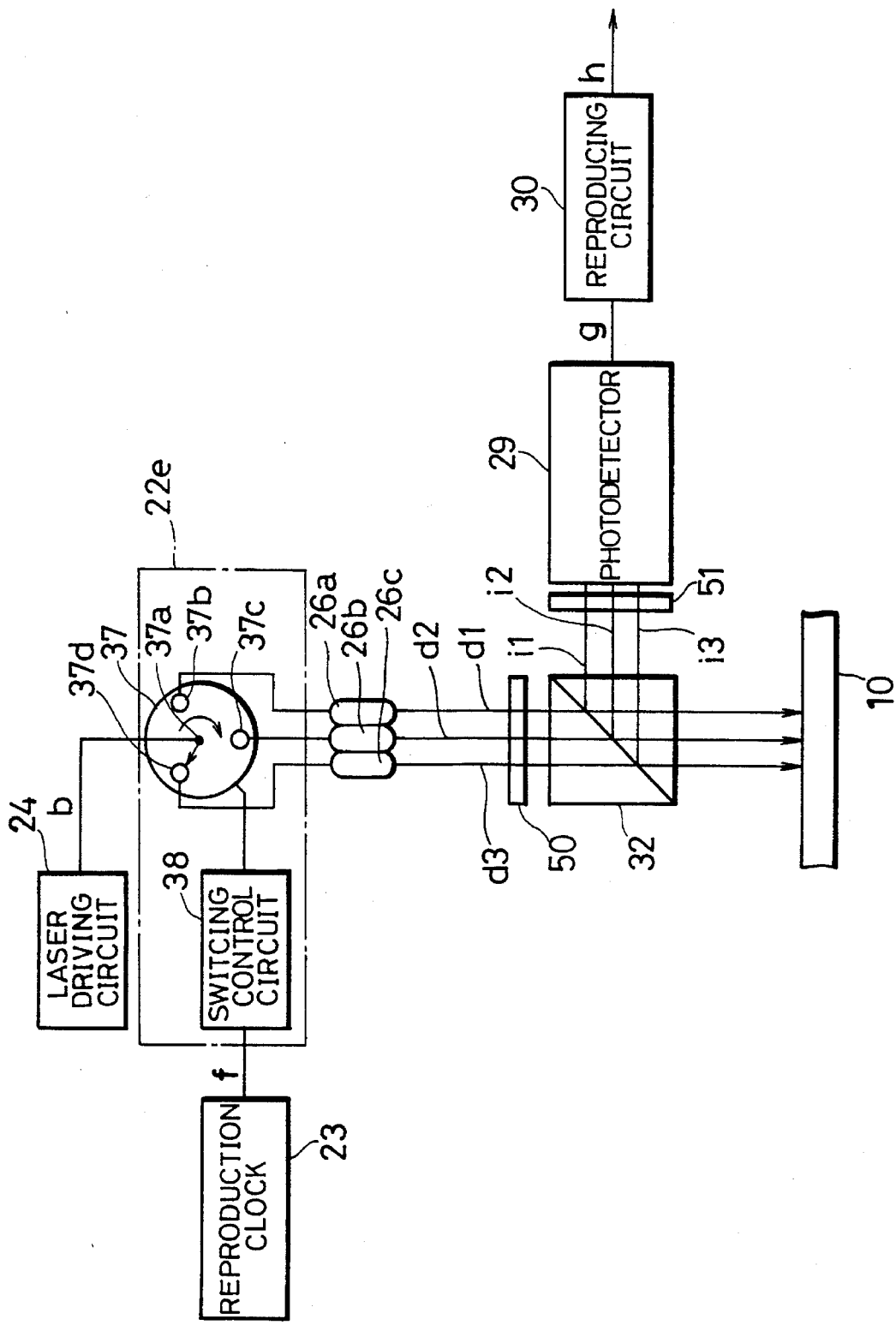

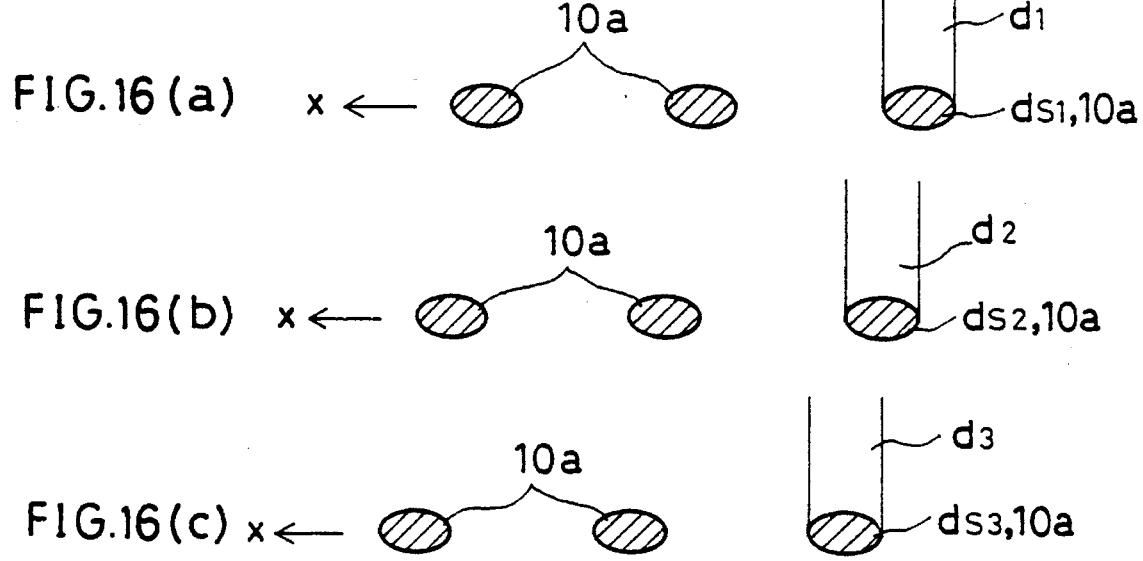
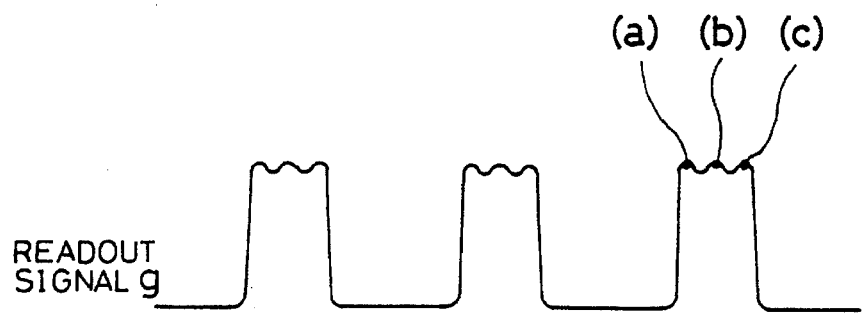

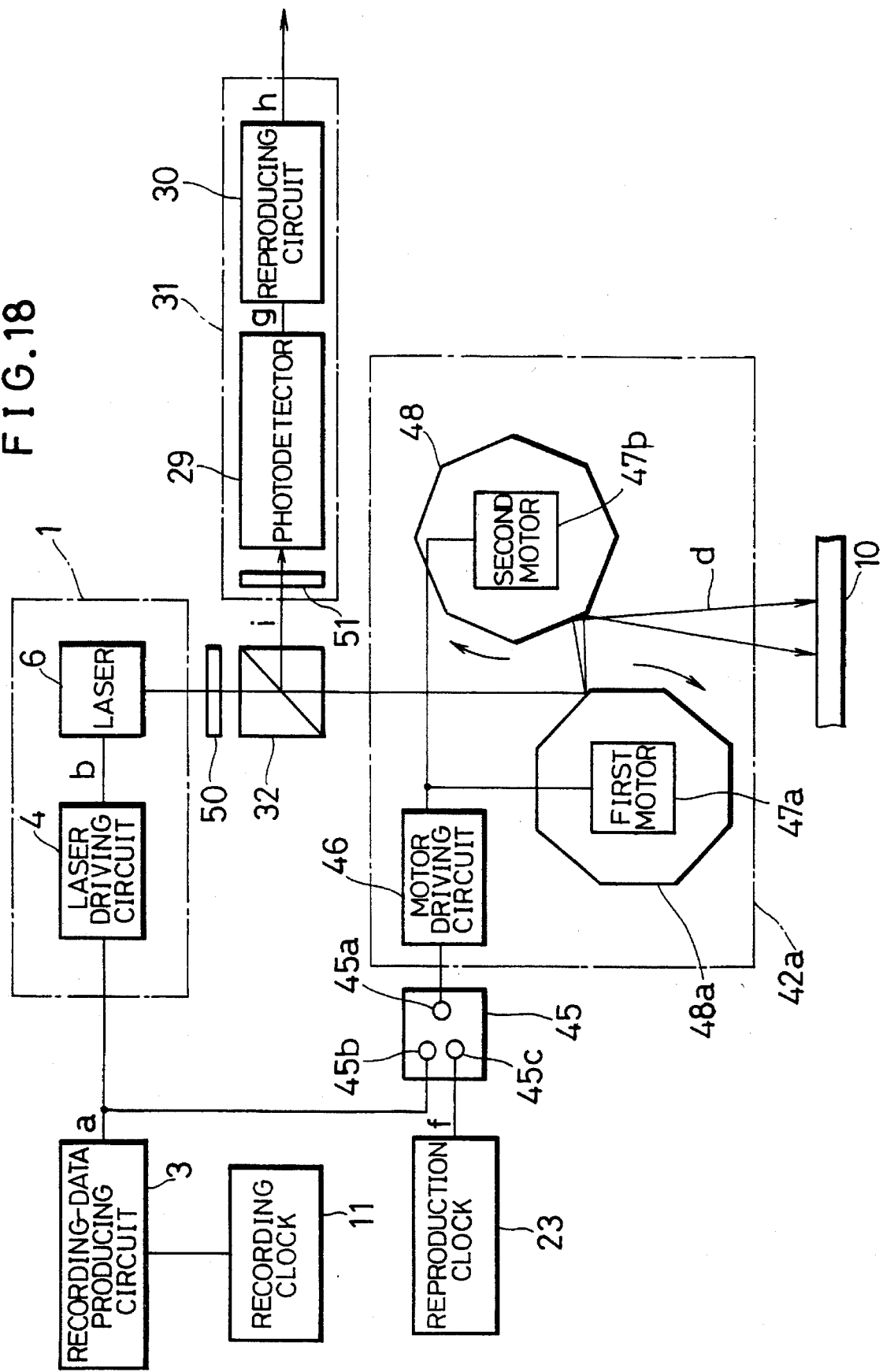
F I G. 18

FIG.20 (a) 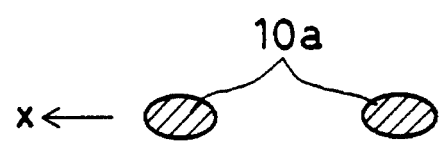 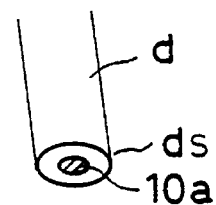
FIG.20 (b) 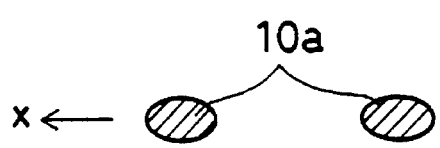 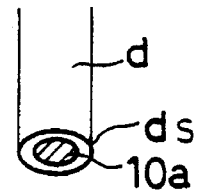
FIG.20 (c) 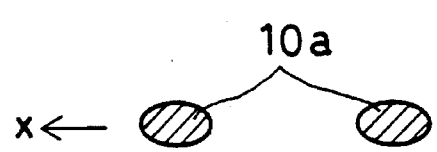 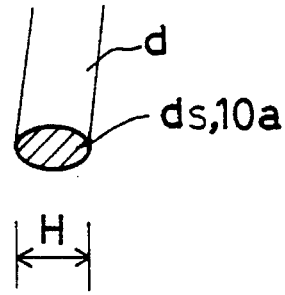

READOUT SIGNAL g

PRIOR ART

DEFLECTING A LIGHT BEAM IN THE SAME DIRECTION AND SPPED OF A RECORDING MEDIUM BY A ROTATING POLYGON OR A HOLOGRAPHIC DISK

FIELD OF THE INVENTION

The present invention relates to optical recording and reproduction devices, such as optical disk devices, optical card devices and optical tape devices.

BACKGROUND OF THE INVENTION

Conventional optical recording devices have one of the structures of conventional examples 1 to 7 described below. Japanese Publication for Unexamined Patent Application No. 182134/1983 discloses a structure (conventional example 1) in which the number of light pulses corresponding to recording data are emitted by a light source and a recording mark of a length proportional to the number of light pulses is recorded. Japanese Publication for Unexamined Patent Application No. 144735/1986 discloses a structure (conventional example 2) in which a evenly shaped recording mark is recorded by increasing the leading edge of a light pulse.

Japanese Publication for Unexamined Patent Application No. 253828/1989 discloses a structure (conventional example 3) in which the interval between unit pulses is decreased from the leading edge of a light pulse toward the trailing edge thereof so as to form a evenly shaped recording mark. Japanese Publication for Unexamined Patent Application No. 46231/1989 discloses a structure (conventional example 4) in which the width of a unit pulse is increased from the loading edge of the light pulse toward the trailing edge thereof so as to form a evenly shaped recording mark.

Japanese Publication for Unexamined Patent Application No. 35425/1991 discloses a structure (conventional example 5) in which the width of a unit pulse and the interval between the ,unit pulses are varied between the leading edge of a light pulse and the trailing edge thereof so as to form a evenly shaped recording mark. Japanese Publication for Unexamined Application No. 185628/1991 discloses a structure (conventional example 6) in which an evenly shaped recording mark is formed by performing recording using light-modulation overwrite method in the same manner as in conventional example 5.

As described above, each of the conventional optical recording devices adjusts the number of recording pulses, the width of a recording pulse and timing so as to record an evenly shaped recording mark.

Meanwhile, a conventional optical reproduction device has the following structure (conventional example 7). Japanese Publication for Examined Patent Application No. 56612/1988 discloses a structure in which reproduction is timely performed by driving a galvano mirror to deflect a light beam in a track direction. By controlling the speed of deflecting the light beam to follow the linear velocity of an optical disk which is varied by eccentric rotation, the relative speed between the beam spot and the recording mark is made constant, restricting a variation in the linear velocity.

Japanese Publication for Unexamined Patent Application No. 229276/1985 discloses an optical recording and reproduction device which performs tracking using a polygon mirror by fixing a recording medium instead of rotating the recording medium, and records/reproduces information by moving a light beam to a desired position on the recording medium (conventional example 8). Journal of Precision Optics Society No. 56, Oct. 1990, pages 13–16, discloses a light-beam deflecting device for use in an optical recording device and an optical reproduction device (conventional example 9).

However, with the structures of conventional examples 1 to 6 and 8, the recording mark tends to have uneven shape. More specifically, as illustrated in FIG. 25, in conventional examples 1 to 6 and 8, the light spot 82 and the recording medium are moved with respect to each other in the X direction and at a linear velocity. Thus, the recording mark 81 is recorded in such a manner that the front portion, the center portion, and the rear portion are recorded in this order as shown in FIGS. 25(a) to 25(c). Therefore, an amount of heat accumulated is increased from FIG. 25(a) toward FIG. 25(c), i.e, toward the rear portion of the recording mark 81. Consequently, as shown in FIG. 26, when recording the recording mark 81, the recording medium has such a temperature distribution that the portions in front of and behind the recording mark 81 have raised temperatures and the portions to be the front and rear portions of the recording mark 81 have different temperatures. Namely, the recording mark 81 has a teardrop shape corresponding to the distribution of temperature exceeding the threshold temperature Tsh.

With the structures of conventional examples 7 and 8, the reliability of the reproduced data is thus lowered even when an evenly shaped recording mark is recorded. More specifically, as illustrated in FIG. 27, similar to recording, the light spot 82 and the recording medium are moved at a linear velocity with respect to each other. Therefore, when reproducing the recording mark 81, the light spot 82 is moved from the front portion shown in FIG. 27(a) through the center portion shown in FIG. 27(b) to the rear portion shown in FIG. 27(c). Consequently, as shown in FIG. 28, the waveform of the readout signal g' from the recording mark 81 becomes dull from FIG. 27(a) to 27(c). Since the S/N (signal to noise) ratio of the readout signal g' is decreased, the reliability of the reproduced data is lowered even when the evenly shaped recording mark is recorded.

Moreover, as illustrated in FIG. 26, when recording the recording mark 81, the front and rear portions of the light spot 82 has temperatures which are lower than the temperature of the center portion and close to the threshold temperature Tsh for the reversal of magnetization. Therefore, the reversal of magnetization becomes unclear and the shape of the recording mark becomes uneven. Regions of the recording medium exposed to the front and rear portions of the light spot 82 have a lower S/N ratio. Thus, if the regions are reproduced with the center portion of the light spot, the reliability of the reproduced data is lowered.

Japanese Publication for Unexamined Patent Application No. 263333/1990 discloses an optical recording and reproduction device which records/reproduces a recording mark while decreasing the relative speed between the light spot 82 and the recording medium by vibrating the light spot 82 in the track direction. With this structure, the above-mentioned drawbacks are overcome.

However, with this device, since the light spot 82 is vibrated, the light spot 82 is reciprocated, and scanning which is unnecessary for recording and reproduction is performed when the light beam is moved backwards. Therefore, even if the light spot 82 follows the recording mark 81 when moved forward, it is difficult to cause the light spot 82 to follow the recording medium at high speeds because moving the light beam backward requires a time equal to the time taken by moving the light beam forward. Additionally, there is a need to reduce the moving speed of the light beam just before switching the moving direction of the light beam from forward to backward or backward to forward before making the moving speed zero and to accelerate the moving speed of the light beam in the opposite direction. It is thus difficult to maintain a stable scanning speed.

SUMMARY OF THE INVENTION

It is an object of the present invention to provide an optical recording device and an optical reproduction device, which are capable of deflecting a light beam at high speeds so that a light spot formed on an optical recording medium when the light beam is applied thereto is moved to follow the optical recording medium.

In order to achieve the above object, an optical recording device of the present invention for forming on a moving recording medium a recording mark corresponding to recording data by focusing a light beam into a light spot on a projection start position on the optical recording medium and raising a temperature of a portion of the optical recording medium exposed to the light spot, includes light-beam deflecting means for repeatedly performing a unidirectional scanning in synchronism with the recording data or a recording clock signal by moving the light spot from the projection start position in a direction equal to a moving direction of the optical recording medium and to follow a moving speed of the optical recording medium.

With this structure, the light-beam deflecting means only performs the unidirectional scanning in synchronism with the recording data or the recording clock signal by moving the light spot in a direction equal to the moving direction of the optical recording medium and to follow the moving speed of the optical recording medium. Therefore, the light spot is moved on the optical recording medium at a constant high speed, and the relative speed between the light spot and the optical recording medium is reduced. Consequently, the light spot is always projected onto the same location (a region to be the recording mark) on the optical recording medium. With this arrangement, the temperature distribution in the region to be the recording mark becomes symmetrical between the front and rear portions thereof, and the temperature of the region is entirely increased. Thus, a recording mark having evenly shaped front and rear edges is formed.

Also, an optical reproduction device of the present invention for generating reproduced data by focusing a light beam into a light spot on a projection start position on a moving optical recording medium having a recording mark formed thereon and by generating a readout signal with reflected light from the light spot based on a reproduction clock signal, includes light-beam deflecting means for repeatedly performing a unidirectional scanning in synchronism with the reproduction clock signal by moving the light spot from the projection start position in a direction equal to the moving direction of the optical recording medium and to follow the moving speed of the optical recording medium.

With this structure, the light-beam deflecting means only performs the unidirectional scanning in synchronism with the reproduction clock signal by moving the light spot in a direction equal to the moving direction of the optical recording medium and to follow the moving speed of the optical recording medium. Therefore, the light spot is moved on the optical recording medium at a constant high speed. Consequently, the light spot is moved to track the center portion of a particular recording mark on the optical recording medium during a period which is synchronism with the reproduction clock signal. With this arrangement, the leading and trailing edges of the waveform of the readout signal produced by the reflected light from the light spot are made sharp, and the S/N (signal to noise) ratio is improved. It is thus possible to improve the reliability of the reproduced data generated by the readout signal. Moreover, since the light spot is moved to track the center portion of the recording mark, noise is removed from the front and rear portions of the recording mark even when the reversal of magnetization of the recording mark is unclear.

Furthermore, the light-beam deflecting means of the optical recording device and the optical reproduction device of the present invention has first deflecting means for deflecting the light beam and second deflecting means for deflecting the light beam deflected by the first deflecting means in the same direction toward the optical recording medium.

With this structure, since the light beam deflected by the first deflecting means is further deflected in the same direction by the second deflecting means, the light beam is deflected at an increased speed in comparison with deflecting the light beam with a single deflecting means. Therefore, even when the moving speed of the optical recording medium is extremely high, the light spot of the light beam projected onto the optical recording medium is moved to follow the moving speed of the optical recording medium. It is thus possible to record a recording mark having evenly shaped front and rear edges and to improve the reliability of the reproduced data.

Additionally, when the present invention is used in a printer for printing, for example, character on recording paper by attracting magnetic toner to the recording paper using magnetic attraction force of a magneto-optical medium, the same effects are produced. In order to increase the magnetic attraction force, it is desirable to increase the film thickness of the medium. If the film thickness of the medium is increased, the heat capacity is increased. With the present invention, it is possible to intensively increase the temperature of the medium. Thus, when the present invention is used in the printer including the medium of a large film thickness, significant effects are produced.

For a fuller understanding of the nature and advantages of the invention, reference should be made to the ensuing detailed description taken in conjunction with the accompanying drawings.

BRIEF DESCRIPTION OF THE DRAWINGS

FIGS. 1, 2(a) to 2(c), 3(a) to 3(c), 4 and 5 illustrate embodiment 1 of the present invention.

FIG. 1 is a block diagram of an optical recording device having a light-beam deflecting section including a polygon mirror.

FIGS. 2(a) to 2(c) are explanatory views illustrating how a light beam is reflected by the polygon mirror.

FIGS. 3(a) to 3(c) are explanatory views illustrating how the recording mark is formed by a light spot which is moved to follow the linear velocity of a magneto-optical disk.

FIG. 4 is an explanatory view showing the temperature distribution of a portion exposed to the light spot.

FIGS. 6, 7(a) to 7(c) and 8 illustrate embodiment 2 of the present invention.

FIG. 6 is a block diagram of an optical recording device having a light-beam deflecting section including a semiconductor switching circuit.

FIGS. 7(a) to 7(c) are explanatory views illustrating how a recording mark is formed by a light spot which is moved to follow the linear velocity of a magneto-optical disk.

FIG. 8 is an explanatory view showing the temperature distribution of a portion exposed to the light spot.

FIGS. 9, 10(a) to 10(c), 11(a) to 11(c), 12 and 13 illustrate embodiment 3 of the present invention.

FIG. 9 is a block diagram of an optical reproduction device having a light-beam deflecting section including a polygon mirror.

FIGS. 10(a) to 10(c) are explanatory views illustrating how a light beam is reflected by the polygon mirror.

FIGS. 11(a) to 11(c) are explanatory views illustrating how a light spot is moved to follow the linear velocity of a magneto-optical disk.

FIG. 12 is an explanatory view showing states of a readout signal.

FIGS. 13(a)–13(d) are explanatory views illustrating reading of a recording mark recorded by the mark edge recording method.

FIG. 14 is a block diagram of an optical reproduction device having a holographic disk according to embodiment 4 of the present invention.

FIGS. 15, 16(a) to 16(c) and 17 illustrate embodiment 5 of the present invention.

FIG. 15 is a block diagram of an optical reproduction device having a light-beam deflecting section including a semiconductor switching circuit.

FIGS. 16(a) to 16(c) are explanatory views illustrating how a light spot is moved to follow the linear velocity of a magneto-optical disk.

FIG. 17 is an explanatory view showing states of a readout signal.

FIGS. 18, 19(a) to 19(c), 20(a) to 20(c), 21, 22(a) to 22(c) and 23 illustrate embodiment 6 of the present invention.

FIG. 18 is a block diagram of an optical recording and reproduction device having a light-beam deflecting section including two polygon mirrors.

FIGS. 19(a) to 19(c) are explanatory views illustrating how a light beam is reflected by the polygon mirrors.

FIGS. 20(a) to 20(c) are explanatory views illustrating how a recording mark is formed by a light spot which is moved to follow the linear velocity of a magneto-optical disk.

FIG. 21 is an explanatory view showing the temperature distribution of a portion exposed to the light spot.

FIGS. 22(a) to 22(c) are explanatory views illustrating how the light spot is moved to follow the linear velocity of a magneto-optical disk.

FIG. 23 is an explanatory view showing states of a readout signal.

FIGS. 25(a) to 25(c) are explanatory views illustrating how a recording mark is formed by a light spot which is moved at a predetermined speed relative to the linear velocity of a magneto-optical disk.

FIG. 26 is an explanatory view showing the temperature distribution of a portion exposed to the light spot.

FIGS. 27(a) to 27(c) are explanatory views illustrating how a recording mark is formed by a light spot which is moved to follow the linear velocity of a magneto-optical disk.

FIG. 28 is an explanatory view showing states of a readout signal.

DESCRIPTION OF PREFERRED EMBODIMENTS

[EMBODIMENT 1]

The following description discusses one embodiment of the present invention with reference to FIGS. 1 to 5.

Figure 1:
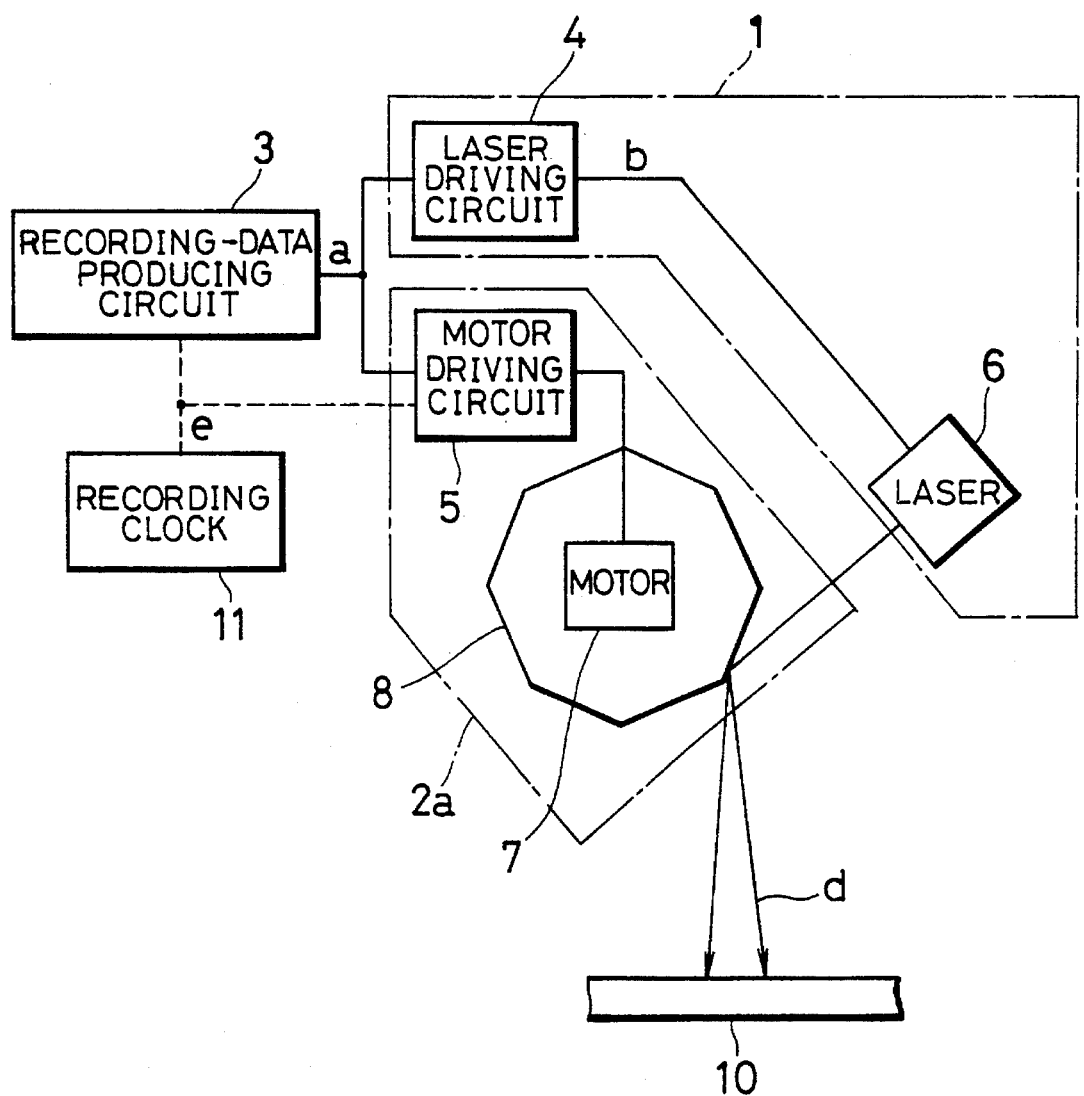
Figure 4:
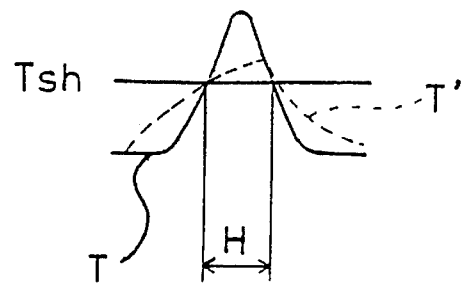
Figure 5A:
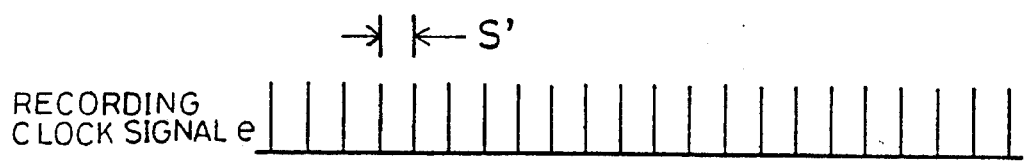
FIG. 5(a)–5(d) are explanatory views illustrating a mark edge recording method.
Figure 5B:
Figure 5C:
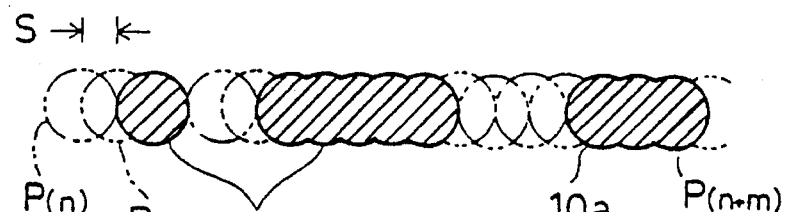
Figure 5D:
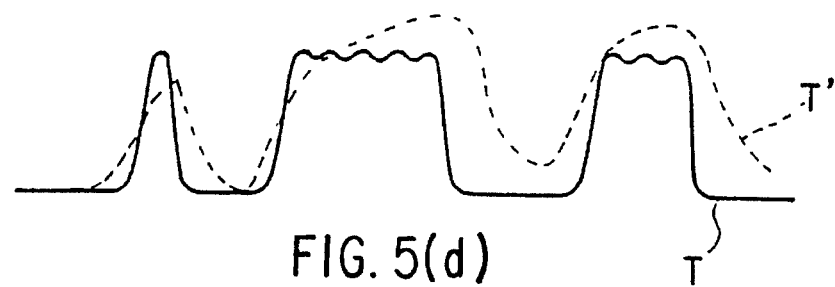

For example, an optical recording device of this embodiment is incorporated into a magneto-optical disk player. As illustrated in FIG. 1, the optical recording device includes a recording-data producing circuit 3 for outputting recording data a. The recording-data producing circuit 3 is connected to a laser driving circuit 4 in a light-beam emitting section 1 and a motor driving circuit 5 (rotation controlling means) in a light-beam deflecting section 2a (light-beam deflecting means). The light-beam emitting section 1 has the laser driving circuit 4, and a semiconductor laser 6 connected to the laser driving circuit 4. When the laser driving circuit 4 outputs a driving current b, the semiconductor laser 6 emits a light beam d as a recording light pulse corresponding to the recording data a toward a polygon mirror 8.

The polygon mirror 8 is included in the light-beam deflecting section 2a, and rotated by a motor 7 connected to the motor driving circuit 5. The motor driving circuit 5 controls a rotational speed of the polygon mirror 8 via the motor 7 so that the polygon mirror 8 is rotated according to the input timing of the recording data a. When the light beam d emitted by the semiconductor laser 6 falls on the polygon mirror 8 rotated by the motor 7, it is reflected toward a magneto-optical disk 10 (a magneto-optical recording medium) to produce a light spot $d_s$ thereon. Since the rotational speed of the polygon mirror 8 is controlled according to the input timing of the recording data a, a unidirectional scanning is repeatedly performed during a predetermined write period which is synchronism with the recording data a by causing the light spot $d_s$ of the light beam d to follow the linear velocity of the magneto-optical disk 10 from the projection start position. Namely, the light spot $d_s$ is moved at the same speed as the linear velocity of the magneto-optical disk 10.

The light beam d may be focused on the magneto-optical disk 10 by an objective lens, not shown. Since the recording medium of this embodiment is the rotating magneto-optical disk 10, the unidirectional scanning is performed by moving the light spot $d_s$ to follow the linear velocity of the magneto-optical disk 10. However, the unidirectional scanning may also be performed in other way. For example, the unidirectional scanning is performed by moving the light spot $d_s$ in the same direction and at the same speed as the moving direction and the moving speed of an optical recording medium such an optical card and an optical tape. Additionally, although it is desirable to move the light spot $d_s$ and the magneto-optical disk 10 at the same speed, they may be moved at slightly different speeds as they enable a great reduction in the relative speed.

The operation of the optical recording device having the above-mentioned structure is explained below.

When the recording data a is output by the recording-data producing circuit 3, the recording data a is supplied to the laser driving circuit 4 and the motor driving circuit 5. The laser driving circuit 4 drives the semiconductor laser 6 to emit the light beam d toward the polygon mirror 8 according to the recording data a.

The light beam d is reflected by the polygon mirror 8 toward the magneto-optical disk 10. At this time, the rotation of the polygon mirror 8 is controlled in synchronism with the recording data a by the motor driving circuit 5 via the motor 7. As shown in FIGS. 2(a) to 2(c), when the polygon mirror 8 is rotated from (a) to (c), the reflection angle of the light beam d changes. Thus, when the light spot $d_s$ of the light beam d is projected onto the magneto-optical disk 10, it follows the linear velocity of the magneto-optical disk 10 from the projection start position. Namely, the light spot $d_s$ is moved at the same speed as the linear velocity of the magneto-optical disk 10.

Consequently, as shown in FIGS. 3(a) to 3(c), the light beam d is kept being projected onto a position H of the magneto-optical disk 10 during a period which is synchronism with the recording data a. As a result, the magneto-optical disk 10 has the temperature distribution shown by the solid line T of FIG. 4. The broken line T' represents the temperature distribution given by a conventional recording method.

As described above, in the optical recording device of this embodiment, the moving speed of the light spot $d_s$ and the linear velocity of the magneto-optical disk 10 are made equal to each other by moving the light spot $d_s$ to follow the linear velocity of the magneto-optical disk 10. This arrangement allows the optical recording device to efficiently use the power of the light beam d. In particular, since the generation of high outputs becomes more difficult as the wavelength of the light beam d is decreased, the efficiency of using the power of the light beam d is significantly improved when performing high-density recording by using a light beam of a short wavelength as the light beam d.

Moreover, with the optical recording device, it is possible to record a recording mark 10a having evenly shaped front and rear edges by arranging a region to be the recording mark 10a to have a symmetrical temperature distribution between the front and rear portions thereof and by intensively raising the temperature of the entire region to exceed a threshold temperature Tsh. If the magneto-optical disk 10 having the recording mark 10a recorded thereon is loaded into an optical reproduction device, it is used as a reproducible magneto-optical disk 10 or used to produce a copy.

This embodiment as well as embodiments 2 to 7 to be described later also produce the above-mentioned effects in a printer for printing, for example, characters on recording paper by attracting the magnetic toner using a magnetic attraction force of a magneto-optical medium and transferring the toner to the recording paper. In order to enhance the magnetic attraction force, the film thickness of the medium may be increased. In this case, however, the heat capacity increases. On the other hand, in the embodiments of the present invention, since the temperature is intensively increased, significant effects are produced in the printer using the medium having a large film thickness.

In this embodiment, the light beam d is deflected by the mark position recording method for forming an isolated recording mark 10a. However, it is also possible to deflect the light beam d by, for example, the mark edge recording method.

The following description discusses an optical recording device in which the light beam d is moved in one direction by the mark edge recording method. As illustrated in FIG. 1, the optical recording device has the recording clock 11 for outputting a recording clock signal e. The recording clock 11 is connected to the recording-data producing circuit 3 and the motor driving circuit 5. When the recording clock signal e is output to the recording-data producing circuit 3 and the motor driving circuit 5, the recording data a is output and the motor 7 is driven according to the recording clock signal e. It is also possible to drive the motor 7 according to the recording data a.

With this structure, as shown in FIG. 5, the polygon mirror 8 driven by the motor 7 moves the light spot $d_s$ by a step distance S to P(n), P(n+1) . . . P(n+m). Since the polygon mirror 8 is rotated in synchronism with the recording clock signal e, the step distance S is equal to step S' of the recording clock signal e. For example, if the light spot $d_s$ of the strong light beam d is projected onto the magneto-optical disk 10 when the recording data a is "1", the light spot $d_s$ is moved to follow the linear velocity of the magneto-optical disk 10. Consequently, only the temperature of a region exposed to the light beam d is raised. As a result, the portions in front of and behind the region representing "1" have a symmetrical temperature distribution as shown by the solid line T, and a recording mark 10a having evenly shaped front and rear edges are formed. The broken line T' represents the temperature distribution given by a conventional recording method.

In this embodiment, a so-called light modulation method in which the intensity of a light beam is modulated according to recording data is used. However, this is a merely an example, and therefore similar effects are produced by using a magnetic modulation method in which an external magnetic field is modulated according to recording data. For example, in FIGS. 5(a)–5(d) the semiconductor laser is switched on and off according to the recording data a. However, with the magnetic-field modulation method, the semiconductor laser is always turned on in synchronism a recording clock signal, and an external magnetic field is modulated according to the recording data a.

[EMBODIMENT 2]

Figure 6:
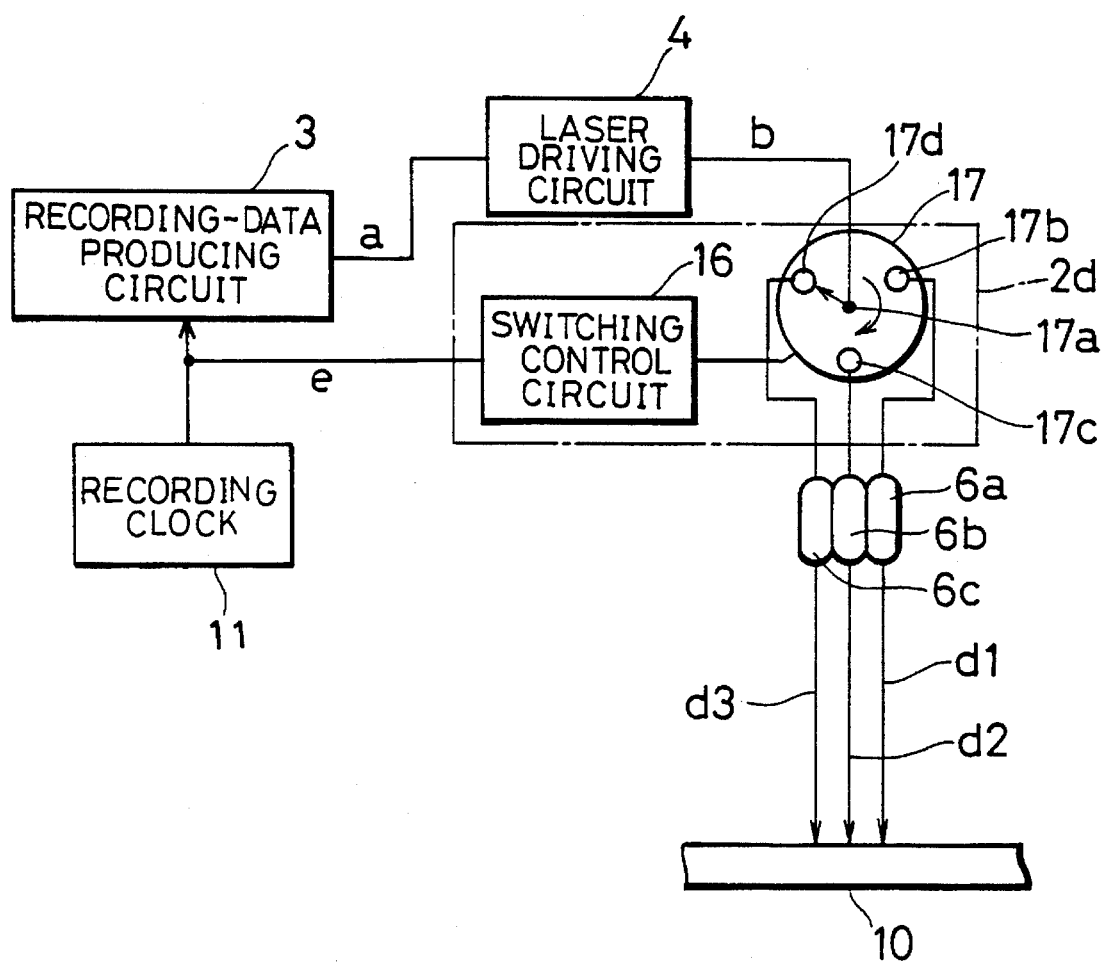

The following description discusses another embodiment of the present invention with reference to FIGS. 6 to 8. The members having the same function as those in embodiment 1 will be designated by the same code and their description will be omitted.

An optical recording device of this embodiment includes a light-beam deflecting section 2d (light-beam deflecting means). The light-beam deflecting section 2d has a switching control circuit 16 (light-beam controlling means) connected to the recording clock 11, and a semiconductor switching circuit 17 connected to the switching control circuit 16 and the laser driving circuit 4. The semiconductor switching circuit 17 has a first input terminal 17a and first to third output terminals 17b to 17d. The first input terminal 17a is connected to one of the first to third output terminals 17b to 17d according to a switching signal. In this embodiment, the switching control circuit 16 outputs the switching signal to the semiconductor switching circuit 17 in synchronism with the input timing of the recording clock signal e. Since the semiconductor switching circuit 17 has the first to third output terminals 17b to 17d, the one pulse of the recording clock signal e becomes synchronous to three pulses of the switching signal.

With this structure, the driving current b is input from the laser driving circuit 4 to the first input terminal 17a. The first to third output terminals 17b to 17d are connected to semiconductor lasers 6a, 6b and 6c (light-beam outputting means), respectively. When the driving current b is input to the semiconductor lasers 6a, 6b, and 6c via the semiconductor switching circuit 17, the light beam d is emitted toward the magneto-optical disk 10. In this embodiment, the projection start position is a position on which the light beam d of the semiconductor laser 6a is focused. The semiconductor laser 6a is located in the upper stream in the rotating direction of the magneto-optical disk 10.

The operation of the optical recording device having this structure is discussed below.

When the recording data a is sent from the recording-data producing circuit 3 to the laser driving circuit 4, the laser driving circuit 4 outputs the driving current b according to the recording data a to the semiconductor switching circuit 17, and the switching control circuit 16 outputs a switching signal to the semiconductor switching circuit 17 so that input timing of the recording clock signal e becomes synchronous to three pulses of the switching signal.

The semiconductor switching circuit 17 connects the first input terminal 17a to one of the first to third output terminals 17b to 17d according to the switching signal. The driving current b is then supplied to the semiconductor lasers 6a to 6c in sequence from the first to the third output terminals 17b to 17d. As a result, the light beams d1 to d3 as recording light pulses are emitted in sequence by the semiconductor lasers 6a to 6c.

The light beams d1 to d3 are focused on the magneto-optical disk 10 by an objective lens, not shown. At this time, the light beams d1 to d3 are output in sequence by the semiconductor lasers 6a to 6c in synchronism with the input timing of the switching signal. The time intervals of emitting the light beams d1 to d3 are set equal to the time taken by a specified recording portion of the magneto-optical disk 10 to cross the semiconductor lasers 6a to 6c.

Therefore, as illustrated in FIGS. 7(a) to 7(c), the light spots $d_{s1}$ to $d_{s3}$ are successively projected onto the same location H on the magneto-optical disk 10 rotating in the X direction. These light spots $d_{s1}$ to $d_{s3}$ cause the magneto-optical disk 10 to have the temperature distribution shown by the solid line T of FIG. 8. The broken line T' represents the temperature distribution given by a conventional recording method.

As described above, with the optical recording device of this embodiment, by switching on the output of the semiconductor lasers 6a to 6c in sequence, a unidirectional scanning is performed by forming the light spots $d_{s1}$ to $d_{s3}$ on the magneto-optical disk 10 while following the linear velocity of the magneto-optical disk 10 and moving the light spots $d_{s1}$ to $d_{s3}$ at the same speed as the linear velocity. With this structure, the temperature distribution of the recording mark 10a becomes symmetrical between the front portion and the rear portion thereof. Namely, since the temperature of the entire recording mark 10a is intensively raised to exceed the threshold temperature Tsh, the recording mark 10 having evenly shaped front and rear edges is formed.

In this embodiment, three semiconductor lasers 6a to 6c are used. However, in order to improve the shape of the recording mark 10a, it is desirable to use an increased number of semiconductor lasers.

[EMBODIMENT 3]

The following description discusses still another embodiment of the present invention with reference to FIGS. 9 to 13.

Figure 9:
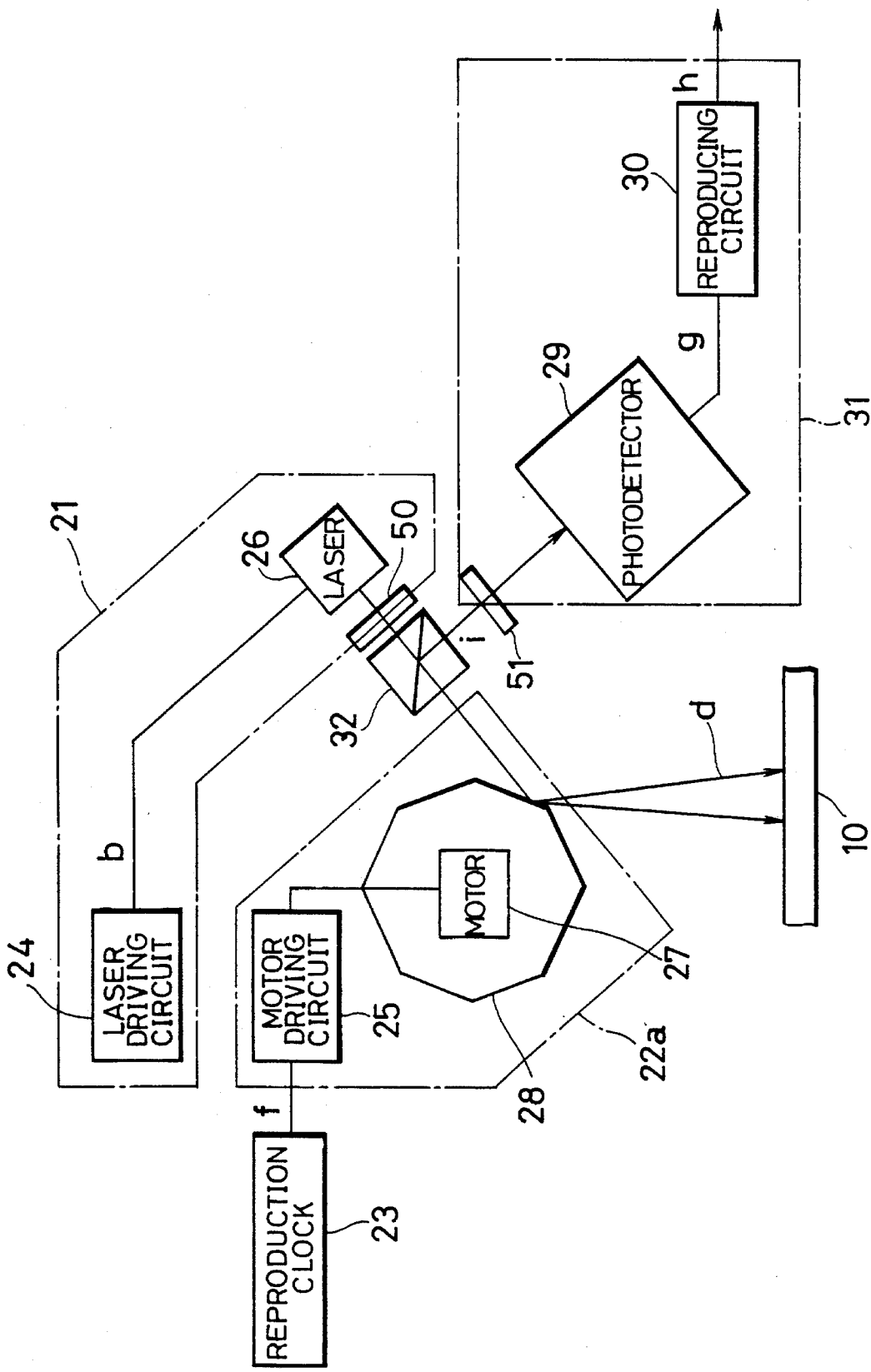

Like the optical recording device of embodiment 1, an optical reproduction device according to this embodiment is incorporated into, for example, a magneto-optical disk player. As illustrated in FIG. 9, the optical reproduction device includes a light-beam emitting section 21 for outputting the light beam d. The light-beam emitting section 21 has a laser driving circuit 24, and a semiconductor laser 26. The laser driving circuit 24 drives the semiconductor laser 26 to emit the weak light beam d toward a polygon mirror 28.

A polarizer 50 and a beam splitter 32 are disposed between the semiconductor laser 26 and the polygon mirror 28. The light beam d from the semiconductor laser 26 passes through the beam splitter 32, while reflected light i from the polygon mirror 28 is reflected by the beam splitter 32 toward a photodetector 29 in a reproducing section 31 through an analyzer 51. The photodetector 29 outputs the reflected light i as the readout signal g to a reproducing circuit 30. The reproducing circuit 30 generates reproduced data h from the readout signal g. The reproducing circuit 30 is a circuit using, for example, generally well known an amplitude detection method or a peak detection method, converts the readout signal g into a binary signal of high or low level, and outputs the reproduced data h in synchronism with a readout signal g.

The optical reproduction device also includes a reproduction clock 23 for outputting the reproduction clock signal f. The reproduction clock 23 is connected to a motor driving circuit 35 (rotation controlling means) in the light-beam deflecting section 22a (light-beam deflecting means). The light-beam deflecting section 22a includes the polygon mirror 28 and a motor 27 in addition to the motor driving circuit 25. The motor driving circuit 25 controls the rotational speed of the polygon mirror 28 via the motor 27 in synchronism with the input timing of the reproduction clock signal f.

When the light beam d from the semiconductor laser 26 is passed through the beam splitter 32 to the polygon mirror 28 rotated by the motor 27, the light beam d is deflected as it is reflected by the polygon mirror 28 toward the magneto-optical disk 10. The rotational speed of the polygon mirror 28 is controlled, so that the unidirectional scanning is repeatedly performed by causing the light spot $d_s$ of the light beam d to follow the linear velocity of the magneto-optical disk 10 from the start position during a predetermined readout period which is synchronism with a reproduction clock signal f. Namely, the light spot $d_s$ is moved at a speed equal to the linear velocity of the magneto-optical disk 10

The operation of the optical reproduction device having the above-mentioned structure is explained below.

The polygon mirror 28 is rotated in synchronism with the input timing of the reproduction clock signal f from the reproduction clock 23 to the motor driving circuit 25. When the driving current b is output by the laser driving circuit 24, the light beam d is emitted by the semiconductor laser 26 toward the polygon mirror 28 via the polarizer 50.

When the light beam d reaches the polygon mirror 28 after passing through the beam splitter 32, it is reflected toward the magneto-optical disk 10 by the polygon mirror 28. As illustrated in FIGS. 10(a) to 10(c), the reflection angle changes as the polygon mirror 28 is rotated. Therefore, the light spot $d_s$ projected onto the magneto-optical disk 10 follows the linear velocity of the magneto-optical disk 10 from the projection start position as shown in FIGS. 11(a) to 11(c). Namely, the light spot $d_s$ is moved at the same speed as the linear velocity of the magneto-optical disk 10. By correcting the position of the light spot $d_s$ to locate the center portion of the light spot $d_s$ on the center of the recording mark 10a, the light spot $d_s$ is moved to track the center portion of a particular recording mark 10a on the magneto-optical disk 10 during a period which is synchronism with the reproduction clock signal f.

As illustrated in FIG. 9, when the light beam d reaches the recording mark 10a, it is reflected as reflected light i toward the polygon mirror 28. The reflected light i from the polygon mirror 28 is passed to the photodetector 20 via the beam splitter 32 and the analyzer 51. The reflected light i is then output as the readout signal g by the photodetector 20 and used by the reproducing circuit 30 to generate the reproduced data h.

As described above, with the optical reproduction device of this embodiment, it is possible to move the light spot $d_s$ to track the center portion of a particular recording mark 10a on the magneto-optical disk 10 during a period which is synchronism with the reproduction clock signal f by deflecting the light beam d by the polygon mirror 28 whose rotation is controlled according to the reproduction clock signal f. Thus, with the optical reproduction device, as illustrated in FIG. 12, it is possible to improve the S/N (signal to noise) ratio by making the leading and trailing edges of the waveform of the readout signal g obtained by detecting the reflected light i from the light spot $d_s$ sharp. Consequently, the reliability of the reproduced data produced using the readout signal g is improved.

In addition, since the light spot $d_s$ is moved to track the center portion of the recording mark 10a, it is possible to remove noise from the front and rear portions of the recording mark 10a even when the reversal of magnetization of portions around the recording mark 10a is unclear.

In this embodiment, the light beam d is deflected by the mark position recording method for forming the isolated recording mark 10a. However, it is also possible to deflect the light beam d by, for example, the mark edge recording method.

More specifically, as illustrated in FIG. 13(a)–13(d), the polygon mirror 28 rotated by the motor 27 moves the light spot $d_s$ by a distance of step distance S to P(n), P(n+1) . . . P(n+m). At this time, since the polygon mirror 28 is rotated in synchronism with the reproduction clock signal f, the step distance S is equal to the step S' of the reproduction clock signal f. Thus, in the period synchronism with the reproduction clock signal f it is possible to focus the light beam d on the center portion of the particular recording mark 10a and to produce the same functions and effects as those produced when reading out a recording mark 10a recorded by the mark position recording method.

[EMBODIMENT 4]

The following description discusses still another embodiment of the present invention with reference to FIG. 14.

An optical reproduction device of this embodiment has the same structure as that of embodiment 3 except for the light-beam deflecting section of embodiment 3. As illustrated in FIG. 14, a light-beam deflecting section 22d (light-beam deflecting means) of this embodiment includes a holographic disk 36 for focusing the light beam b on the magneto-optical disk 10.

The motor 27 connected to the motor driving circuit 25 is mounted on the rotation axis of the holographic disk 36. The motor driving circuit 25 rotates the holographic disk 36 in the direction of an arrow based on the input timing of the reproduction clock signal f to the motor driving circuit 25 so as to change the transmission angle of the light beam d.

With this arrangement, the optical reproduction device repeatedly performs the unidirectional scanning by moving the light spot $d_s$ focused on the magneto-optical disk 10 at the same speed as the linear velocity of the magneto-optical disk 10 from the projection start position. It is thus possible to focus the light beam d on the center portion of the particular recording mark 10a during the period which is synchronism with the reproduction clock signal f and to produce the same functions and effects as those in embodiment 3.

In this embodiment, the optical reproduction device using the holographic disk 36 is discussed. Similarly, if the holographic disk 36 is used in the light-beam deflecting section of an optical recording device, the same effects are produced.

[EMBODIMENT 5]

The following description discusses still another embodiment of the present invention with reference to FIGS. 15 to 17. The members having the same function as those in embodiment 3 will be designated by the same code and their description will be omitted.

As illustrated in FIG. 15, an optical reproduction device of this embodiment includes a light-beam deflecting section 22e (light-beam deflecting means). The light-beam deflecting section 22e has a switching control circuit 38 connected to the reproduction clock 23, and a semiconductor switching circuit 37 connected to the switching control circuit 38 and the laser driving circuit 24.

The switching control circuit 38 outputs a switching signal to the semiconductor switching circuit 37 in synchronism with the input timing of the reproduction clock signal f. The switching signal is set so that three pulses of the switching signal and one pulse of the reproduction clock signal f are synchronous. The semiconductor switching circuit 37 has a first input terminal 37a and first to third output terminals 37b to 37d, and connects the first input terminal 37a to one of the first to third output terminals 37b to 37d according to the switching signal.

The driving current b from the laser driving circuit 34 is input to the first input terminal 37a of the semiconductor switching circuit 37. The first to third output terminals 37b to 37d of the semiconductor switching circuit 37 are connected to semiconductor lasers 26a to 26c, respectively. When the driving current b is input to the semiconductor lasers 26a to 26c via the semiconductor switching circuit 37, the semiconductor lasers 26a to 26c emit light beams $d_1$ to $d_3$ toward the magneto-optical disk 10.

A beam splitter 32 is disposed between the semiconductor lasers 26a to 26c and the magneto-optical disk 10. The beam splitter 32 allows the light beams $d_1$ to $d_3$ emitted from the semiconductor lasers 26a to 26c to be passed to the magneto-optical disk 10, and reflects the light beams $i_1$ to $i_3$ reflected by the magneto-optical disk 10 toward the photodetector 29. The photodetector 29 outputs the reflected light as the readout signal g to the reproducing circuit 30. The reproducing circuit 30 generates the reproduced data h from the readout signal g. In this embodiment, the projection start position is a position where the light beam $d_1$ emitted by the semiconductor laser 26a is projected. The semiconductor laser 26a is located in the upper stream in the rotating direction of the magneto-optical disk 10.

The operation of the optical reproduction device having the above-mentioned structure is discussed below.

When the driving current b from the laser-driving circuit 24 is input to the semiconductor switching circuit 37, the reproduction clock signal f is supplied from the reproduction clock 23 to the switching control circuit 38. Then, the switching control circuit 38 outputs a switching signal to the semiconductor switching circuit 37 in synchronism with the input timing of the reproduction clock signal f.

When the driving current b and the switching signal are input to the semiconductor switching circuit 37, the semiconductor switching circuit 37 connects the first input terminal 37a to one of the first to third output terminals 37b to 37d according to the switching signal. The driving current b is then supplied in sequence from the first to third output terminals 37b to 37d to the semiconductor lasers 26a to 26c. Thus, the semiconductor lasers 26a to 26c successively output the light beams $d_1$ to $d_3$.

The light beams $d_1$ to $d_3$ pass through the beam splitter 32 and are focused on the magneto-optical disk 10. At this time, the light beams $d_1$ to $d_3$ are successively emitted by the semiconductor lasers 26a to 26c in synchronism with the input timing of the switching signal. The time intervals of emitting the light beams $d_1$ to $d_3$ are set to the time taken by the recording mark 10a to cross the semiconductor lasers 26a to 26c.

As shown in FIGS. 16(a) to 16(c), the light beams $d_1$ to $d_3$ are focused on the same location on the magneto-optical disk 10 moving in the X direction to form the light spots $d_{s1}$ to $d_{s3}$ successively. These light spots $d_{s1}$ to $d_{s3}$ are projected onto the center portion of a particular recording mark 10a on the magneto-optical disk 10 during the period which is synchronism with the reproduction clock signal f.

When the light beams $d_{s1}$ to $d_{s3}$ are projected onto the recording mark 10a, they are reflected as reflected light $i_1$ to $i_3$ toward the beam splitter 32 and further reflected toward the photodetector 29 by the beam splitter 32 as shown in FIG. 15. Then the reflected light $i_1$ to the reflected light $i_3$ are output as the readout signal g to the reproducing circuit 30 from the photodetector 29, and the readout signal g is used for the generation of the reproduced data h in the reproducing circuit 30.

Thus, as illustrated in FIG. 17, with the optical reproduction device of this embodiment, the waveform of the readout signal g obtained by detecting the reflected light from the light spot $d_s$ has sharp leading and trailing edges, and therefore the S/N ratio is improved. Consequently, the reliability of the reproduced data h generated using the readout signal g is improved.

In addition, since the optical reproduction of this embodiment enables the light spot $d_s$ to be moved to track the center portion of the recording mark 10a, it is possible to remove noise from the front and rear portions of the recording mark 10a even when the reversal of magnetization of the recording mark 10a is unclear.

In this embodiment, three semiconductor lasers 26a to 26c are used. However, in order to improve the S/N ratio of the readout signal g, it is desirable to use an increased number of semiconductor lasers.

[EMBODIMENT 6]

The following description discusses still another embodiment of the present invention with reference to FIGS. 18 to 23. The members having the same function as those in embodiments 1 and 3 will be designated by the same code and their description will be omitted.

Like the optical recording device of embodiment 1 and the optical reproduction device of embodiment 3, an optical recording and reproduction device of this embodiment includes a light-beam deflecting section 42a (light-beam deflecting means) having a first polygon mirror 48a (first deflecting means) and a second polygon mirror 48b (second deflecting means).

The first polygon mirror 48a and the second polygon mirror 48b are disposed so that the light beam d is reflected toward the second polygon mirror 48b by the first polygon mirror 48a and further reflected toward the magneto-optical disk 10 by the second polygon mirror 48b. The first polygon mirror 48a and the second polygon mirror 48b include a first motor 47a and a second motor 47b, connected to the motor driving circuit 46, respectively. The motor driving circuit 46 controls the first polygon mirror 48a and the second polygon mirror 48b to be rotated in the direction of arrows according to the input timing of the recording data a or the reproduction clock signal f via the first and second motors 47a and 47b.

The motor driving circuit 46 is connected to an output terminal 45a of a selecting switch 45 having two input terminals and one output terminal. The recording data a from the recording-data producing circuit 3 is input to the input terminal 45b of the selecting switch 45, while the reproduction clock signal f from the reproduction clock 23 is input to the input terminal 45c. When recording, the selecting switch 45 connects the input terminal 45b to the output terminal 45a so as to output the recording data a to the motor driving circuit 46. On the other hand, the selecting switch 45 connects the input terminal 45c to the output terminal 45a so as to output the reproduction clock signal f to the motor driving circuit 46. Except for these changes, the recording and reproduction device of this embodiment has the same structure as the optical recording device and the optical reproduction device of embodiments 1 and 3.

The operation of the optical recording and reproduction device having the above-mentioned structure is discussed below.

When executing recording, the input terminal 45b of the selecting switch 45 is connected to the output terminal 45a. Then, the recording data a from the recording-data producing circuit 3 is supplied to the laser driving circuit 4, and to the motor driving circuit 46 via the selecting switch 45. The laser driving circuit 4 causes the semiconductor laser 6 to emit the light beam d corresponding to the recording data a toward the first polygon mirror 48a. When the light beam d reaches the first polygon mirror 48a, it is deflected as it is reflected toward the second polygon mirror 48b. When the light beam d falls upon the second polygon mirror 48b, it is deflected in the same direction because it is reflected toward the magneto-optical disk 10.

At this time, the first polygon mirror 48a and the second polygon mirror 48b are rotated by the first and second motors 47a and 47b which are driven by the motor driving circuit 46. Therefore, the angle of reflecting the light beam d reflected by the first polygon mirror 48a is varied with the rotation of the second polygon mirror 48b as shown in FIGS. 19(a) to 19(c). Thus, even when the linear velocity of the magneto-optical disk 10 is extremely high, the light beam d focused into the light spot $d_s$ on the magneto-optical disk 10 follows the linear velocity of the magneto-optical disk 10 because the speed of deflecting the light beam d is increased by the second polygon mirror 48b. Consequently, the light spot d is moved at the same speed as the linear velocity of the magneto-optical disk 10.

Hence, as illustrated in FIGS. 20(*a*) to 20(*c*), even when the linear velocity of the magneto-optical disk 10 is extremely high, the light spot $d_s$ is always focused on the same location H which becomes the projection start position on the magneto-optical disk 10 during the period synchronism with the recording clock signal e. Namely, the magneto-optical disk 10 has the temperature distribution shown by the solid line T in FIG. 21. The broken line T' represents the temperature distribution produced by a conventional recording method. With this arrangement, the temperature distribution of a region to be the recording mark 10a becomes symmetrical between the front and rear portions thereof, and the temperature of the entire region is intensively raised to exceed the threshold temperature Tsh. As a result, the recording mark 10a having evenly shaped front and rear edges is formed.

When performing reproduction, the input terminal 45c of the selecting switch 45 is connected to the output terminal 45a. Thus, the reproduction clock signal f is supplied from the reproduction clock 23 to the motor driving circuit 46 via the selecting switch 45.

When the reproduction clock signal f output from the reproduction clock 23 is supplied to the motor driving circuit 25 via the selecting switch 45, the first polygon mirror 48a and the second polygon mirror 48b are rotated in synchronism with the input timing of the reproduction clock signal f to the motor driving circuit 46. The semiconductor laser 6 emits a weak light beam d for use in reproduction toward the first polygon mirror 48a when the laser driving circuit 4 outputs the driving current b.

The light beam d passes through the beam splitter 32 and falls on the first polygon mirror 48a. When the light beam is reflected by the first polygon mirror 48a, it is deflected as it is reflected toward the second polygon mirror 48b. The light beam d is deflected in the same direction when it is reflected toward the magneto-optical disk 10 by the second polygon mirror 48b.

Figure 19:
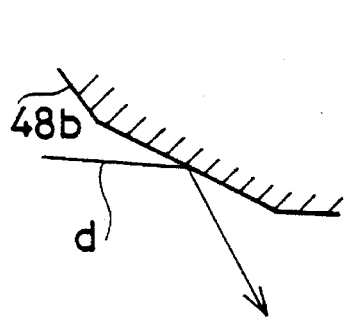
Figure 19:
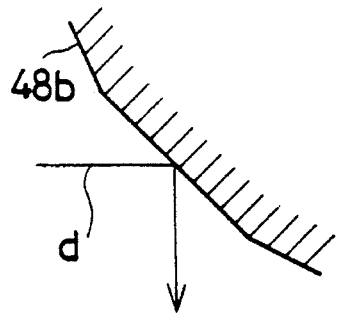
Figure 19:
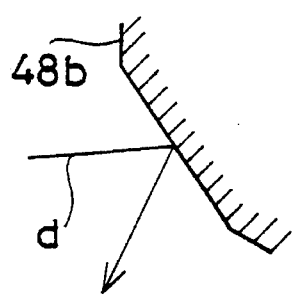
Figure 21:
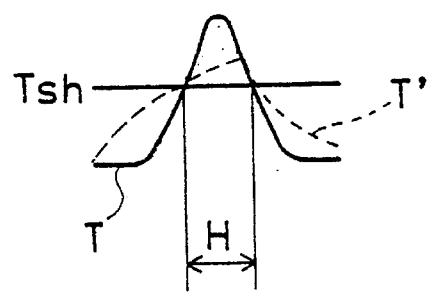
Figure 22A:
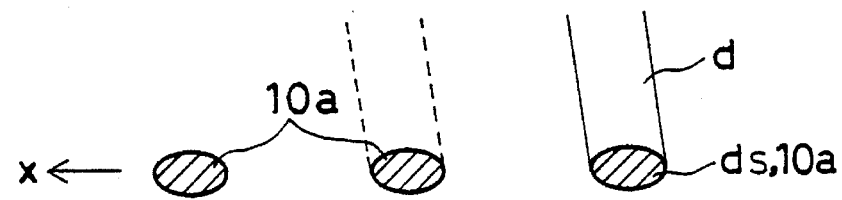
Figure 22B:
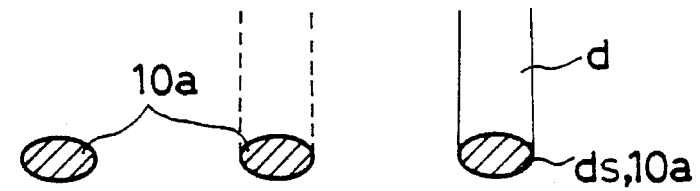
Figure 22C:
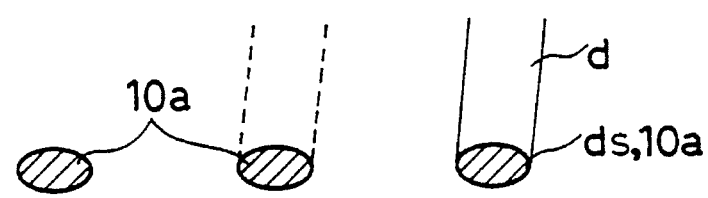

Consequently, as shown in FIGS. 19(*a*) to 19(*c*), the reflection angle of the light beam d changes as the second polygon mirror 48b rotates. When the light beam d is focused into the light spot $d_s$, the light spot $d_s$ follows the linear velocity of the magneto-optical disk 10 as shown are FIGS. 22(*a*) to 22(*c*). Namely, the light spot $d_s$ is moved at the same speed as the linear velocity of the magneto-optical disk 10. Then, by correcting the center portion of the light spot $d_s$ to be positioned on the center portion of the recording mark 10a, the light spot $d_s$ is moved to track the center portion of a particular recording mark 10a on the magneto-optical disk 10 from the projection start position during a period which is synchronism with the reproduction clock signal f.

When the light beam d reaches the recording mark 10a, it is reflected as the reflected light i toward the polygon mirror 28 as shown in FIG. 18. The reflected light i is then passed to the photodetector 29 via the beam splitter 32. When the reflected light i reaches the photodetector 29, it is output as the readout signal g to the reproducing circuit 30 and used for the generation of the reproduced data h. Therefore, even when the linear velocity of the magneto-optical disk 10 is extremely high, the light spot $d_s$ formed on the magneto-optical disk 10 follows the linear velocity of the magneto-optical disk 10 as the speed of deflecting the light spot $d_s$ is increased by the second polygon mirror 48b. Namely, the light spot $d_s$ is moved at the same speed as the linear velocity of the magneto-optical disk 10.

Figure 23:
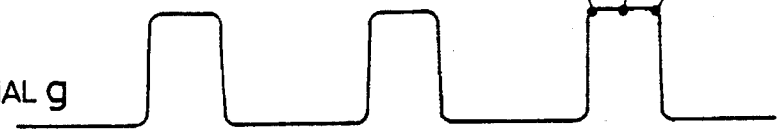

With this structure, as illustrated in FIG. 23, even when the linear velocity of the magneto-optical disk 10 is extremely high, the optical recording and reproduction device achieves an improved S/N ratio by causing the waveform of the readout signal g which is obtained by detecting the reflected light i to have sharp leading and trailing edges. As a result, the reliability of the reproduced data h produced by using the readout signal g is improved.

Moreover, since the optical recording and reproduction device of this embodiment moves the light spot $d_s$ to track the center portion of the recording mark 10a, it is possible to remove noise from the front and rear portions of the recording mark 10a even when the reversal of magnetization of the[recording mark 10a is unclear.

In this embodiment, the light beam d is deflected by the mark position recording method for producing an isolated recording mark 10a. However, it is not necessary to use this method, and the light beam d may also be deflected by, for example, the mark edge recording method like embodiments 1 and 3. In this case, the function and effects similar to those obtained in embodiments 1 and 3 are produced. This embodiment discusses a so-called light modulation method in which the intensity of a light beam is modulated according to a recording data. However, it is also possible to produce similar effects by using a magnetic-modulation method for modulating the intensity of an external magnetic field into recording data.

[EMBODIMENT 7]

Figure 24:
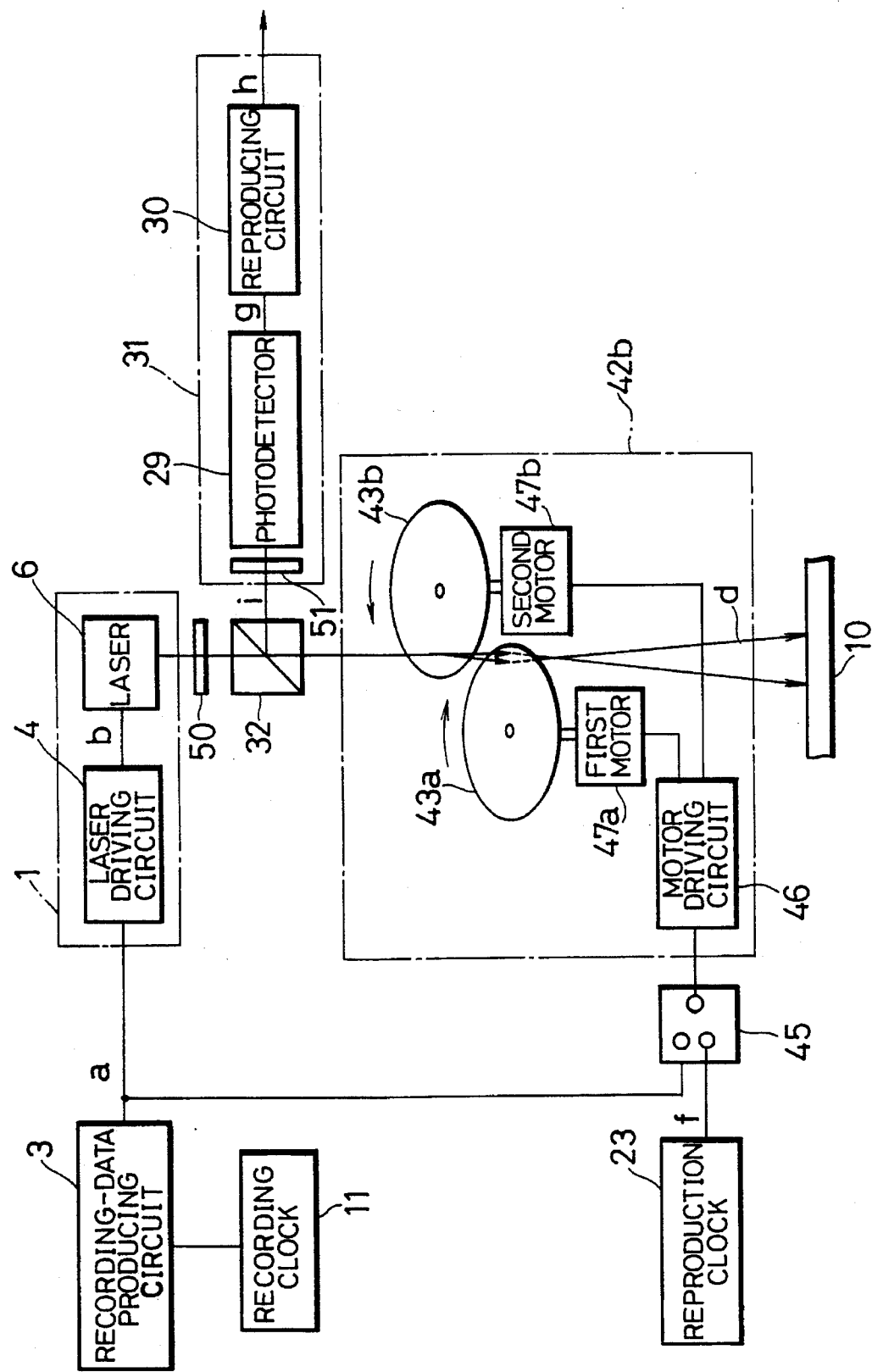
FIG. 24 is a block diagram of an optical recording and reproduction device having a light-beam deflecting section including two holographic disks according to embodiment 7 of the present invention.
Figure 25A:
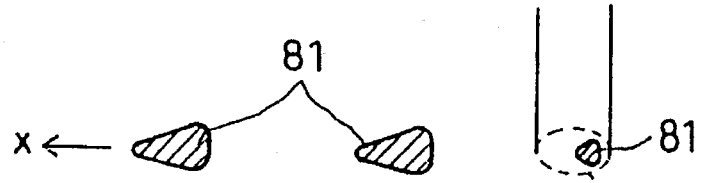
FIGS. 25(a) to 25(c), 26, 27(a) to 27(c) and 28 illustrate conventional examples.
Figure 25B:
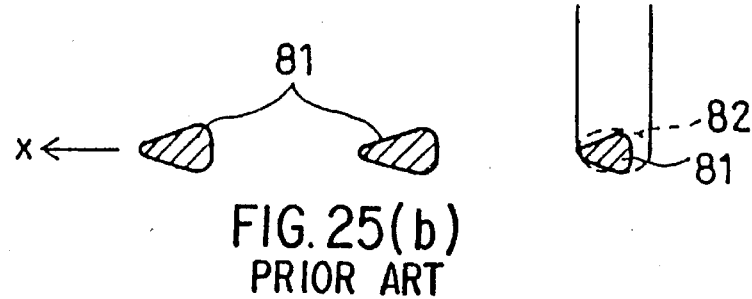
Figure 25C:
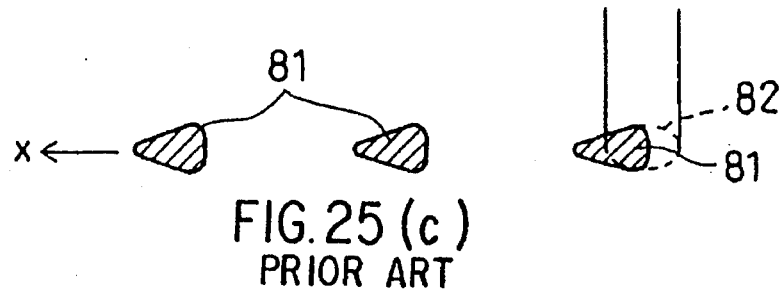
Figure 26:
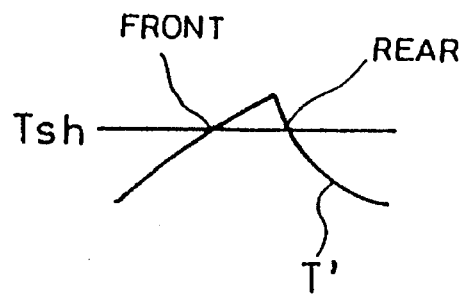
Figure 27A:
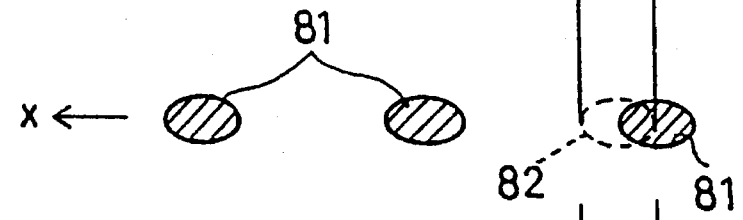
Figure 27B:
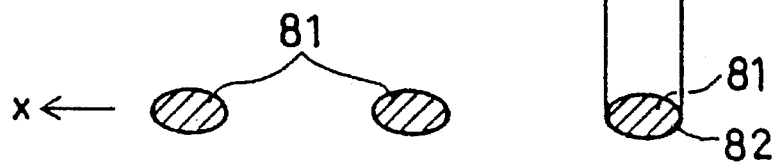
Figure 27C:
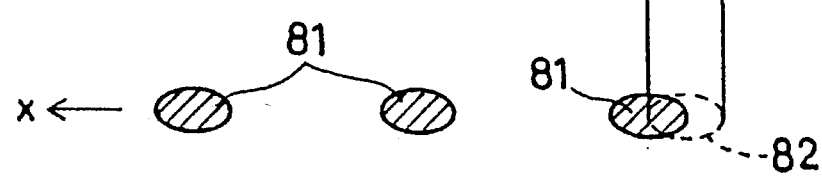
Figure 28:
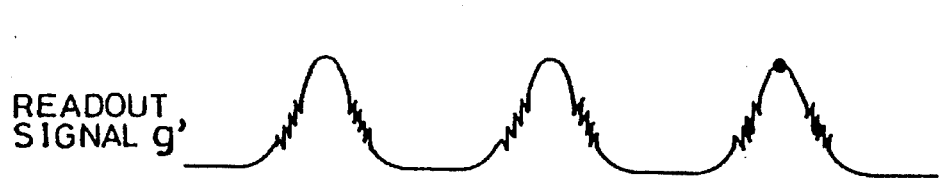

The following description discusses still another embodiment of the present invention with reference to FIG. 24.

The recording and reproduction device of this embodiment has the same structure as that of embodiment 6 except the structure of the light-beam deflecting section. As illustrated in FIG. 24, a light-beam deflecting section 42b (light-beam deflecting means) of this embodiment includes first and second holographic disks 43a and 43b for focusing the light beam d on the magneto-optical disk 10. The first holographic disk 43a and the second holographic disk 43b are disposed so that the light beam d emitted from the semiconductor laser 6 passes through both of the first and second holographic disks 43a and 43b and that the light beam d is projected to the magneto-optical disk 10 by deflecting the light beam d while changing the transmission angle of the second holographic disk 43b and by further deflecting the light beam d in the same direction while changing the transmission angle of the first holographic disk 43a.

The first and second holographic disks 43a and 43b are rotated by the first and second motors 47a and 47b, respectively. The first and second motors 47a and 47b are connected to the motor driving circuit 46 which controls the first and second holographic disks 43a and 43b to be rotated in synchronism with the input timing of the recording data a and the reproduction clock signal f. The motor driving circuit 46 is connected to the selecting switch 45. Except for these changes, the structure of the optical recording and reproduction device of this embodiment are the same as that of embodiment 6.

With this structure, during recording and reproduction, when the light beam d is emitted by the semiconductor laser 26, the light beam d is passed to the second holographic disk 43b via the beam splitter 32. The light beam d is then deflected by the second holographic disk 43b and directed toward the first holographic disk 43a. When the light beam d reaches the first holographic disk 43a, it is further deflected in the same direction by the first holographic disk 43a. After the speed of deflecting the light beam d is increased, the light beam d is focused on the magneto-optical disk 10.

Therefore, even when the linear velocity of the magneto-optical disk 10 is extremely high, the light spot $d_s$ formed on the magneto-optical disk 10 follows the linear velocity of the magneto-optical disk 10 because the speed of deflecting the light beam d is increased by the first holographic disk 43a. Namely, the light spot $d_s$ is moved at the same speed as the linear velocity of the magneto-optical disk 10. Consequently, even when the linear velocity of the magneto-optical disk 10 is very high, like embodiment 10, the optical recording and reproduction device of this embodiment produces the recording mark 10a having evenly shaped front and rear edges, improving the reliability of the reproduced data h.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical recording device for forming on a moving recording medium a recording mark corresponding to recording data by focusing a light beam into a light spot on a projection start position on said optical recording medium and raising a temperature of a portion of said optical recording medium exposed to the light spot, comprising light-beam deflecting means for repeatedly performing a unidirectional scanning in synchronism with the recording data or a recording clock signal by moving the light spot from the projection start position in a direction equal to a moving direction of said optical recording medium and to follow a moving speed of said optical recording medium.

2. The optical recording device according to claim 1, wherein said light-beam deflecting means includes:

a polygon mirror for reflecting the light beam toward said optical recording medium; and rotation controlling means for controlling a rotational speed of said polygon mirror so that the light spot of a light beam reflected by said polygon mirror is moved in a direction equal to the moving direction of said optical recording medium and to follow a moving speed of said optical recording medium.

3. The optical recording device according to claim 1, wherein said light-beam deflecting means includes:

a plurality of light-beam outputting means for emitting a light beam toward said optical recording medium; and light-beam controlling means for controlling said light-beam outputting means to successively emit a light beam to form a light spot so that the light spot is moved in a direction equal to the moving direction of said optical recording medium and to follow the moving speed of said optical recording medium.

4. The optical recording medium according to claim 1, wherein said light-beam deflecting means includes:

a holographic disk for allowing the light beam to pass through toward said optical recording medium; and rotation controlling means for controlling a rotational speed of said holographic disk so that a light spot of a light beam from said holographic disk is moved in a direction equal to the moving direction of said optical recording medium and to follow the moving speed of said optical recording medium.

5. The optical recording medium according to claim 1, wherein said light-beam deflecting means includes:

first deflecting means for deflecting the light beam; and second deflecting means for causing the light beam deflected by said first deflecting means to reach said optical recording medium by deflecting the light beam in the same direction.

6. The optical recording medium according to claim 5, wherein each of said first deflecting means and said second deflecting means comprises a polygon mirror for reflecting a light beam.

7. The optical recording medium according to claim 5, wherein each of said first deflecting means and said second deflecting means comprises a holographic disk which allows a light beam to pass through.

8. The recording device of claim 1, wherein the scanning speed of the light spot and the linear velocity of the recording medium are substantially equal to each other.

9. The recording device of claim !, further comprising:

means for always maintaining the light spot on one fixed region of the recording medium during a period in which a recording mark is formed in the said fixed region, by moving the light spot so as to follow the movement of the medium.

10. The recording device of claim 1 wherein:

the light-beam deflecting means further includes means for moving the light spot to a projection start position before the start of a period in which a next recording mark is to be formed on the recording medium.

11. An optical reproduction device for producing reproduced data by focusing a light beam into a light spot on a projection start position on a moving recording medium having a recording mark formed thereon and generating a readout signal using reflected light from said light spot based on a reproduction clock signal, comprising light-beam deflecting means for repeatedly performing a unidirectional scanning in synchronism with the recording data or a recording clock signal by moving the light spot from the projection start position in a direction equal to a moving direction of said optical recording medium and to follow a moving speed of said optical recording medium.

12. The optical recording medium according to claim 11, wherein said light-beam deflecting means includes:

first deflecting means for deflecting the light beam; and second deflecting means for causing the light beam deflected by said first deflecting means to reach said optical recording medium by deflecting the light beam in the same direction.

13. The optical recording medium according to claim 12, wherein each of said first deflecting means and said second deflecting means comprises a polygon mirror for reflecting a light beam.

14. The optical recording medium according to claim 12, wherein each of said first deflecting means and said second deflecting means comprises a holographic disk which allows a light beam to pass through.

15. The optical reproduction device according to claim 11, wherein said light-beam deflecting means includes:

a polygon mirror for reflecting the light beam toward said optical recording medium; and rotation controlling means for controlling a rotational speed of said polygon mirror so that the light spot of a light beam reflected by said polygon mirror is moved in a direction equal to the moving direction of said optical recording medium to follow the moving speed of said optical recording medium.

16. The optical reproduction device according to claim 11, wherein said light-beam deflecting means includes:
- a plurality of light-beam outputting means for emitting a light beam toward said optical recording medium; and
- light-beam controlling means for controlling an output timing of a light beam of said light-beam outputting means so that the light beam is successively emitted by each of said light-beam outputting means and that light spots of the light beams are moved in a direction equal to the moving direction of said optical recording medium and to follow the moving speed of said optical recording medium.

17. The optical recording medium according to claim 11, wherein said light-beam deflecting means includes:
- a holographic disk for allowing the light beam to pass through toward said optical recording medium; and
- rotation controlling means for controlling a rotational speed of said holographic disk so that a light spot of a light beam from said holographic disk is moved in a direction equal to the moving direction of said optical recording medium and to follow the moving speed of said optical recording medium.

18. An optical recording device for forming on a moving recording medium a recording mark corresponding to recording data by focusing a light spot on a projection start position on said optical recording medium and raising a temperature of a portion of said optical recording medium exposed to the light spot, comprising:
- laser source means for generating a laser beam for forming said light spot on said medium; and
- causing means for causing said light spot to follow said portion of said medium during a period in which information is recorded in said portion.

19. The device of claim 18 wherein:
- said causing means includes an optical deflector driven by a control circuit having a control input connected to a source of data to be recorded.

20. The device of claim 18 wherein:
- said causing means includes an optical deflector means for repeatedly performing a unidirectional scanning in synchronism with the recording data or a recording clock signal.

* * * * *